Sept. 29, 1970 W. W. JAXHEIMER ETAL 3,531,771
AUTOMATIC REMOTE-METER READING SYSTEM FOR DIAL TYPE METERS
Filed March 4, 1968
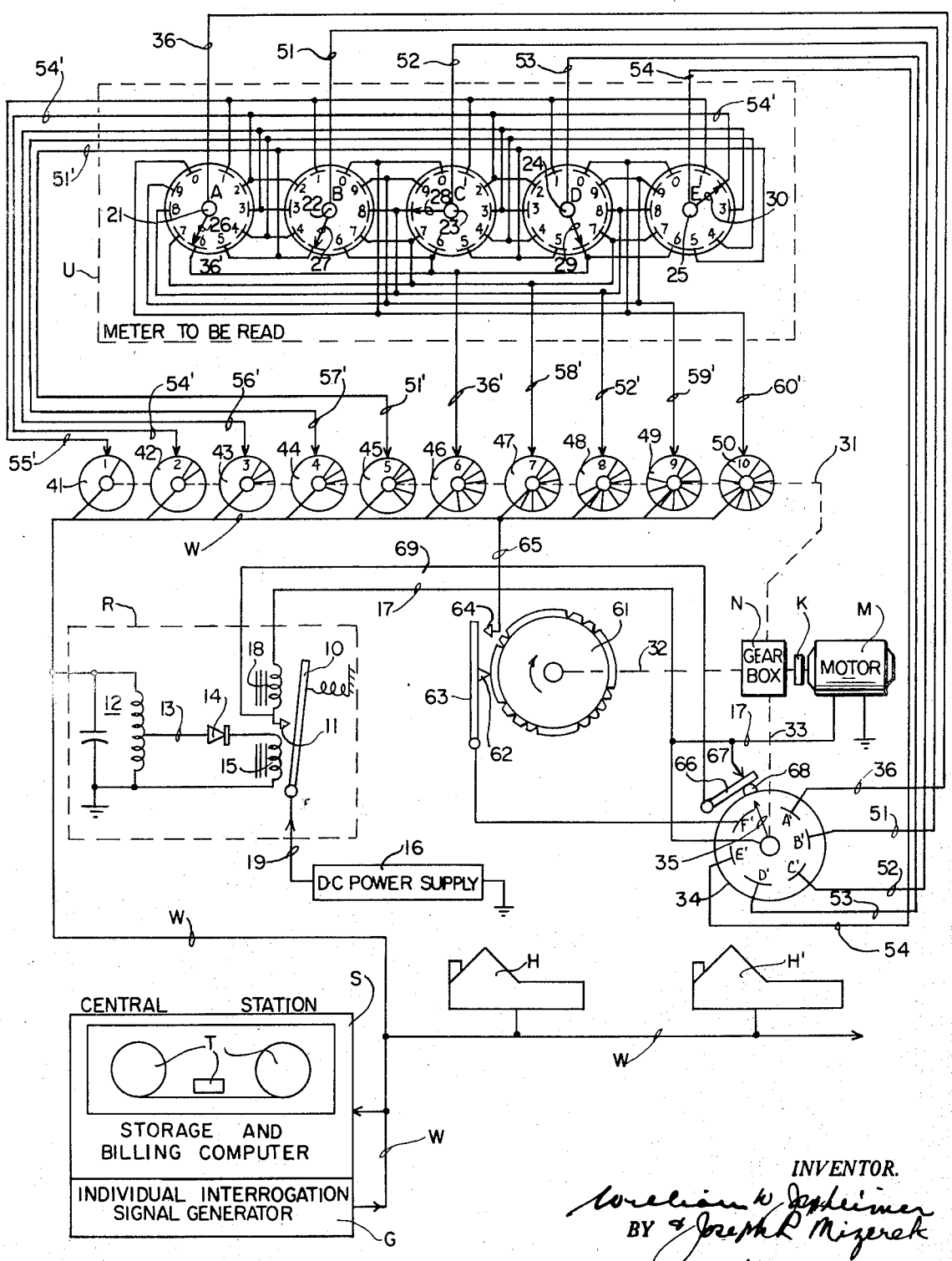
INVENTOR.
William W. Jaxheimer
BY Joseph L. Mizerek
Harold L. Stowell
ATTORNEY

United States Patent Office 3,531,771
Patented Sept. 29, 1970

3,531,771
AUTOMATIC REMOTE-METER READING SYSTEM FOR DIAL TYPE METERS
William W. Jaxheimer, 139 Wall St., Kingston, N.Y. 12401, and Joseph R. Mizerek, Woodstock, N.Y.; said Mizerek assignor to said Jaxheimer
Filed Mar. 4, 1968, Ser. No. 710,378
Int. Cl. H04g 9/10
U.S. Cl. 340—151   8 Claims

ABSTRACT OF THE DISCLOSURE

A system for sequentially reading a large number of remotely located meters from a central station or business office which is connected by a single wire to all of said meters and has means for storing the incoming meter readings, for instance in the illustrated embodiment as part of a utilities billing function. Each remote location has an activating circuit sensitive to a unique interrogating signal generated at the central station, upon receipt of which signal the selected meter reading system is set into operation. The reading unit in each remote location includes a series of digital contactors, each attached for rotation with a corresponding dial of the remote meter being read, and each numerical position of the digital contactors is connected to a corresponding pulsating switch of the same numerical value. A motor in the remote meter-reader selects the digital contactors one at a time and then sweeps through the pulsating switch positions thereby to deliver to the wire from the central station a series of pulses representing the then position of the selected digital contactor. Thereafter, the motor moves on to select the next digital contactor, and repeats the sweeping of the pulsating switches until all digital contactors have been read. Finally the remote unit reads out a code confirming its identity to the central station, and then turns itself off.

---

This invention relates to remote meter reading systems of the type which, upon interrogation from a central station, activates itself and automatically delivers trains of pulses in a sequence which represents the positions of the digital dials of a meter being read, identifies itself, and then shuts itself off.

It is a principal object of this invention to provide an economical and versatile system which can be attached to a great variety of meters, such as utility gas, water or electric meters, gasoline pump meters, or other types of scientific metering means, to provide reliable remote indications of their positions.

Another major object of this invention is to provide an efficient system which can sequentially read a very large number of remote meters over a single wire, this wire parallel-connecting all such meters to a central station, and the system performing without ambiguity or cross-talk, and lending itself well to multiplex techniques. Alternatively, telephone lines may be used instead of specially-installed wiring.

Still another object of the invention is to provide a unique remote-unit selection and interrogation system by which each remote unit is provided with a circuit which is sensitive to a unique characteristic of the interrogating signal, in the present embodiment to the frequency thereof, to activate the selected remote unit which then holds itself in operating condition until its function is completed at which time it releases the holding means and becomes again inoperative. The interrogating signal need be maintained on the wire to the remote unit only very briefly until the holding means operates, and thereafter the only signals appearing on the common wire are the meter-reading pulses being returned to the central station for use in billing the customer.

A further object of the invention is to provide a flexible system which can be easily adapted for cooperation with a metering device having any number of indicator dials, and moreover, can be either built into a new meter or can be easily attached to an existing one already installed in a building simply by removing the glass face from the meter and laying the present unit over the dial pointers with simple mechanical couplings thereto. The power required for operating the present meter reading unit would be negligible, merely enough to run a small motor for about ten to thirty seconds per month, and can be taken directly from the meter device if electrical, or can be taken from a small power supply attached to the building utility power line.

Other objects and advantages of the invention will become apparent during the following discussion of the drawing, wherein:

One practical embodiment according to the invention is illustrated in schematic form in the drawing.

Referring now to the illustrative embodiment, the block in the lower left-hand corner of the drawing represents the central business office of station S which interrogates a plurality of utility meters U located in remote buildings, such as the houses H and H' to which the central station S is connected by a single wire W working against ground as the return path. The central station includes recording apparatus T for receiving and storing signals returned from the remote meter reading units, which signals are then used for billing purposes, for instance by a computer. The central station also includes a generator G for generating any one of a large number of unique interrogation signals each of which will activate one of the remote meter-reading units when sent out on the wire W in a manner to be hereinafter explained The houses H and H' represent other remote units, but the remaining portion of the diagram represents the content of one such remote unit, as follows.

In the present illustrative embodiment the characteristic of the interrogating signal from the generator G which will uniquely actuate one of the remote meter-reading units is the frequency of the signal, for instance a tone from a sonic or supersonic oscillator, or a plurality of such tones. In each remote unit there is located a relay system R including a frequency sensitive activating relay and a holding relay both operative to attract a common armature 10 to complete a circuit with an electrical contact 11. The activating relay includes a resonant circuit 12 connected to the wire W to receive an interrogating signal, the circuit 12 delivering a large output on wire 13 when the signal generated by the interrogation generator G corresponds with its own resonant frequency. The output on the wire 13 is rectified by a diode 14 and energizes the winding 15 to attract the armature 10 and complete a circuit with the contact point 11. When this circuit is completed, a motor M is energized from a power source 16 through the wires 17 and 19, and the current drawn by the motor through the holding winding 18 maintains the armature 10 against the contact 11 so that the signal on the wire W from the generator G can be terminated, whereby the activating relay means 12, 13, 14, 15 is no longer required to hold the armature 10. The current to drive the motor is taken from the power supply 16 which could comprise a small rechargeable battery, or a small rectifier system connected to the power-line service at the building where the meter is installed to supply current for the brief moment that the motor remains operative during reading the meter in the manner to be hereinafter explained.

Assume for the sake of illustration that the metering device which is to be read by the present circuitry is represented by the dashed line box U, which may for instance be a utility meter. The meter shown has five dials on its face which are to be read, and therefore the reader device according to the present invention will include five contactor devices A, B, C, D, and E, each one of which has a central shaft 21, 22, 23, 24, and 25, which is connected mechanically to the corresponding pointer shaft (not shown) of the meter U so that the wipers 26, 27, 28, 29 and 30 rotate in unison with the dial pointers of the meter. The motor M is connected by a coupling K to a gear box N having three output shafts 31, 32, and 33. The shaft 33 drives a rotary selecting switch 34 having a wiper 35 which can contact any one of the contacts A', B', C', D', E', and F', the wiper 35 rotating clockwise from the position in which it is illustrated in the drawing back to this same position, at which time the system has completed its function and again becomes inoperative.

Assuming that the armature 10 is now completing a circuit with the contact 11 and driving the motor M through the wire 17, the wiper 35 of the selecting switch 34 will rotate around until it completes a circuit with the contact A' at which time it will deliver voltage from the wire 17 through the wiper 35 into the wire 36 and to the wiper 26 of the contactor A. The wiper 26 is completing a circuit through the contact in the decimal position 6, and therefore current will be passed through the wire 36' to one of ten pulsating switch wafers 41, 42, 43, 44, 45, 46, 47, 48, 49 and 50. In this case, the wire 36' connects with the pulsating switch 46 which has six segments on it wired to produce six pulses as the wafer goes around during one revolution of the shaft 31. All the pulsating switches 41 through 50 are connected to the wire W, and all ten of the pulsating switch wafers rotate on the drive shaft 31 from the gear box N. Therefore six pulses will be read out through the pulsating switch 46 onto the wire W.

The shaft 33 rotates at one-sixth the rate of the shaft 31 so that when all of the wafers of pulsating switches 41 through 50 have returned to their upright positions, the wiper 35 of the selecting switch 34 will have just left the contact A' and moved to the contact B', and therefore into contact with the wire 51 which is connected to the wiper 27 within the digital contactor B. It will be noted that the digital contactor B is in position #5, and that all of the #5 positions from all of the contactors A through E are connected to the wire 51', which is connected to the pulsating switch 45 which has five segments so that five pulses can be delivered to the wire W for each complete revolution of the shaft 31. Therefore, the train of six pulses representing the output of dial A as set forth above will be followed by a train of five pulses representing the 5th position of the contactor B. By the time the shaft 31 has completed its second revolution, the shaft 33 will have turned the wiper 35 to touch the contact C' and thereby energize the wire 52 which is connected to the wiper 28 of the digital contactor C. All of the #8 positions of the digital contactors A through E are connected to the wire 52' which connects to the pulsating switch 48 which has eight segments so that during the next rotation of the shaft 31 a train of eight pulses will be delivered to the wire W.

Subsequently when these eight pulses are completed the wiper 35 will have moved to the contact D', and thereby energize the wire 53 which is connected to the wiper 29 of the digital contactor D, again shown in the 6th position so that power will be transferred into the wire 36' and to the pulsating switch 46, which will deliver a train of six pulses to the wire W leading back to the central station 1. When the shaft 31 has completed this rotation, the wiper 35 in the selecting switch 34 will have moved to the contact E', thereby energizing the wire 54 which in turn energizes the wiper 30 of the digital contactor E which is in the #2 position to thereby energize the wire 54' which is connected to all #2 positions of the digital contactors A through E. The wire 54' connects to pulsating switch 42 which during a complete rotation of shaft 31 delivers two pulses to the wire W leading to the central station.

In similar manner, the wire 55' connects all of the #1 positions of the digital contactors A through E to the pulsating switch 41 which delivers one pulse per revolution of the shaft 31, and the wire 56' connects the pulsating switch 43 to all of the #3 positions of the digital contactors, and the wire 57' connects the pulsating switch 44 to all of the #4 positions of the digital contactors A through E. The wire 58' connects the pulsating switch 47 to all #7 positions of the digital contactors, the wire 59' connects to all #9 positions of the digital contactors to the pulsating switch 49, and the wire 60' connects all the #0 positions of all digital contactors with the pulsating switch 50, which delivers a train of 10 pulses to the wire W for one complete rotation of the shaft 31 if the wire 60' is energized.

Recapitulating, the wiper 35 on the selecting switch 34 has now moved through contacts A', B', C', D', and E' and the motor M is still running. Five trains of pulses have been delivered to the central station S through the wire W representing the positions of the five digital contactors A through E, and now the circuit seeks to identify itself to the central station using the code wheel 61, the wiper 35 of the selecting switch 34 having just moved on to touch the contact F'. The shaft 32 is geared to rotate at the same rate as the shaft 31, and turns the notched code wheel 61 against the follower pawl 62 of the switch arm 63. During one complete revolution, which we will assume is in a clockwise direction from the position shown in the drawing, the code wheel will actuate the arm 63 against the contact 64 to send out four pulses, followed by a space, followed by five more pulses, followed by a space, followed by three pulses, followed by a space, followed by two more pulses. By this time the code wheel 61 will have turned back to its initial position and the identifying number 4532 will have been sent on the wire W to the central station S confirming that it was meter 4532 which has just been read. The power for all these pulses was taken from the wire 17, the wiper 35, the contact F', the arm 63, the contatc 64 and the wire 65.

The only remaining function of the system is to turn itself off. This is accomplished by using the switch arm 66 and contact 67 which form a normally open switch, but which can be closed by the lobe 68 which is rotated by the shaft 33 in unison with the wiper 35. When the switch 66–67 is closed the wire 69 is short-circuited to the wire 17, and therefore the holding current in the relay winding 18 is by-passed, thereby permitting the armature 10 to drop open to the position shown in the drawing to disconect the power supply 16 from the circuit, de-energizing the motor, and leaving the switch 66–67 and lobe 68 in the position sown in the drawing. The next time the meter is to be read by the central station the interrogating signal from the generator G will have to be applied to the wire W so as to energize the winding 15 and close the armature 10 against the contact 11 long enough to drive the shaft 33 to a position where the lobe 68 no longer holds the switch 66–67 closed. When this condition is reached the holding relay winding 18 will then become operative again to maintain the flow of power to the motor until the lobe 68 again reaches and operates the switch 66–67 in the manner described above. Thus, it will be seen that six complete rotations of the shafts 31 and 32 complete the meter reading and identifying cycle, and during that time the shaft 33 has completed only one revolution. The gear ratio between the shaft 33 and the shafts 31 and 32 is numerically one greater than the number of digital contactors A thorugh E. For example since there are five contactors the ratio is 1:6, but if there were only four digital contactors the ratio would be 1:5. The contact segments labeled 1, 2, 3, 4, 5, 6, 7, 8, 9, and 0 on the contactors A through E and the contact segments A′, B′, C′, D′, E′, and F′ have only a very small space between them in a practical embodiment of the instrument and the wipers are made so that they will always make contact with one of these segments regardless of the position of the mechanism.

Although the present invention is illustrated in terms of an embodiment using frequency sensitive relay means 12, 13, 14, 15, it is to be understood that other systems can be used which are sensitive to different characteristics of the interrogating signals from the generator G. For example, multiple pulses having certain time spacings could be used to operate the relay systems R or the system could be voltage-operated, or even operated by a combination of different types of interrogating characteristics. Moreover, other electronic devices such as transistors or veractors can be used in various combinations to increase the sensitivity or the rejection capabilities of the interrogation system. The various dials of the meter to be read can be read in any desired sequence, and any meter location attached to the wire W can be individually read at any particular time. The invention is also intended to cover the use of various electronic, integrated or micro, circuitry in place of the digital contactors for producing the pulses which represent the momentary positions of the meter dials. These and other variations are intended to be included within the scope of the following claims.

What is claimed is:

1. A system for selectively reading the dials of a plurality of remotely located meters and for delivering trains of pulses over a transmission line extending from a reader at each of said meters to a central station having means to receive said pulses, comprising:
   (a) means at the central station for generating and applying to said transmission line one of a plurality of different interrogating signals each uniquely assigned to the reader at one of said meters;
   (b) motor means at each meter reader;
   (c) means located at each meter reader and responsive to one of said interrogtaing signals to apply power to said motor means, and including holding means for maintaining power to said motor means after termination of said interrogating signal;
   (d) digital contactor means at each reader and having rotor means coupled to each meter dial to be positioned by the associated dial to close one of a number of digit contacts depending upon its position;
   (e) a pulsating switch for each different digit contact position of said contactors, all corresponding digits of all contactors being respectively connected to the same pulsating switch, and all pulsating switches being conected to the transmission line and coupled to and rotated in unison by said motor means, the pulsating switches each having a total number of segments corresponding with the respective digits which they represent so that when selected each can deliver a corresponding number of pulses per revolution to said transmission line;
   (f) dial selecting means having a contact corresponding with and connected to the digital contactor at each meter dial, the selecting means being coupled to the motor means and operative to select a different dial after each revolution of the pulsating switches; and
   (g) means actuated by said dial selecting means to release said holding means after all dials have been selected.

2. In a meter-reading system as set forth in claim 1, said dial selecting means having an extra contact following the dial selecting contacts and preceding said holding-means release; and means for generating an encoded identification of the meter being read, the latter means being conected to deliver said identification to the transmission line when said extra contact is selected.

3. In a meter-reading system as set forth in claim 2, said identification generating means comprising switch means connected to apply power to the transmission line from said extra contact, and code wheel means coupled to and rotated by said motor means and operative to modulate said switch means.

4. In a meter-reading system as set forth in claim 1, said interrogation signal generating means comprising a generator for generating a variety of output tone signals, the signal-responsive means to said meter readers comprising tuned circuits resonant to selected ones of said signals and delivering an output to hold a motor-control relay closed during the signal; and said holding means comprising a winding connected to pass the current drawn by the motor and made operative thereby to hold the relay closed.

5. In a meter-reading system as set forth in claim 4, said holding-means release comprising switch means for interrupting the flow of current through said holding winding, said dial selecting means having means for actuating this switch means after all dial contacts have been selected.

6. In a meter-reading system as set forth in claim 1, said motor means including gear reducer means having one shaft for rotating said pulsating switches, and having another shaft for driving said dial selecting means from contact to contact, the gear ratio being such that the selecting means is advanced by one contact for each complete revolution of said pulsating switches.

7. In a meter-reading system as set forth in claim 1, each digital contact means including an annular series of contacts corresponding with the numerical positions of the associated meter dial and sequentially engaged by said rotor means, each rotor means being connected to a contact of the dial selecting means, and each of the contacts in an annular series being connected to a different pulsating switch.

8. In a meter-reading system as set forth in claim 7, each pulsating switch representing a different numerical dial position and including a plurality of interconnected contact segments corresponding in number to the associated numerical dial position, the pulsating switch making intermittent connection with said segments as it rotates, and each pulsating switch being connected in series between said transmission line and all of the corresponding numerical positions of said contactor means.

References Cited

UNITED STATES PATENTS 3,414,676  12/1968  Long _____ 340—151

HAROLD PITTS, Primary Examiner

U.S. Cl. X.R.

340—150, 163, 164, 167